United States Patent
Hay

(10) Patent No.: US 9,975,584 B1
(45) Date of Patent: May 22, 2018

(54) WIND DEFLECTION SYSTEM

(71) Applicant: Martin Hay, Muncie, IN (US)

(72) Inventor: Martin Hay, Muncie, IN (US)

( * ) Notice: Subject to any disclaimer, the term of this patent is extended or adjusted under 35 U.S.C. 154(b) by 0 days. days.

(21) Appl. No.: 15/433,350

(22) Filed: Feb. 15, 2017

(51) Int. Cl.
*B62D 35/00* (2006.01)
*B62J 17/04* (2006.01)

(52) U.S. Cl.
CPC ............ *B62D 35/005* (2013.01); *B62J 17/04* (2013.01)

(58) Field of Classification Search
CPC . B62J 17/02; B62J 17/04; B62J 17/06; B62D 35/005; B62D 35/008
USPC .......................... 296/180.1, 78.1, 91, 93, 217
See application file for complete search history.

(56) References Cited

U.S. PATENT DOCUMENTS

| | | | |
|---|---|---|---|
| 4,066,291 A * | 1/1978 | Hickman | B60S 1/0438 135/115 |
| 4,132,994 A * | 1/1979 | Caldwell | H01Q 1/1271 343/711 |
| 4,911,494 A | 3/1990 | Imai et al. | |
| 5,409,287 A | 4/1995 | Suzuki | |
| 5,529,365 A * | 6/1996 | Saunders | B62J 17/04 296/208 |
| D394,635 S | 5/1998 | Saunders | |
| 5,855,404 A | 1/1999 | Saunders | |
| 6,253,635 B1 | 7/2001 | Huber | |
| 7,237,819 B2 | 7/2007 | Fox et al. | |
| 7,347,485 B1 | 3/2008 | Saunders | |
| 7,837,253 B1 | 11/2010 | Swender | |
| 8,469,434 B2 | 6/2013 | Tsukui et al. | |
| 9,132,875 B2 | 9/2015 | Kato | |

FOREIGN PATENT DOCUMENTS

DE 4427464 * 2/1996

* cited by examiner

*Primary Examiner* — Dennis H Pedder

(57) ABSTRACT

A wind deflection system for deflecting wind on a vehicle includes a vehicle that has a windshield to redirect wind with respect to a rider of the vehicle. A deflecting unit is coupled to the windshield to deflect wind upwardly with respect to the rider. In this way the deflecting unit inhibits the wind from striking the rider's head.

2 Claims, 4 Drawing Sheets

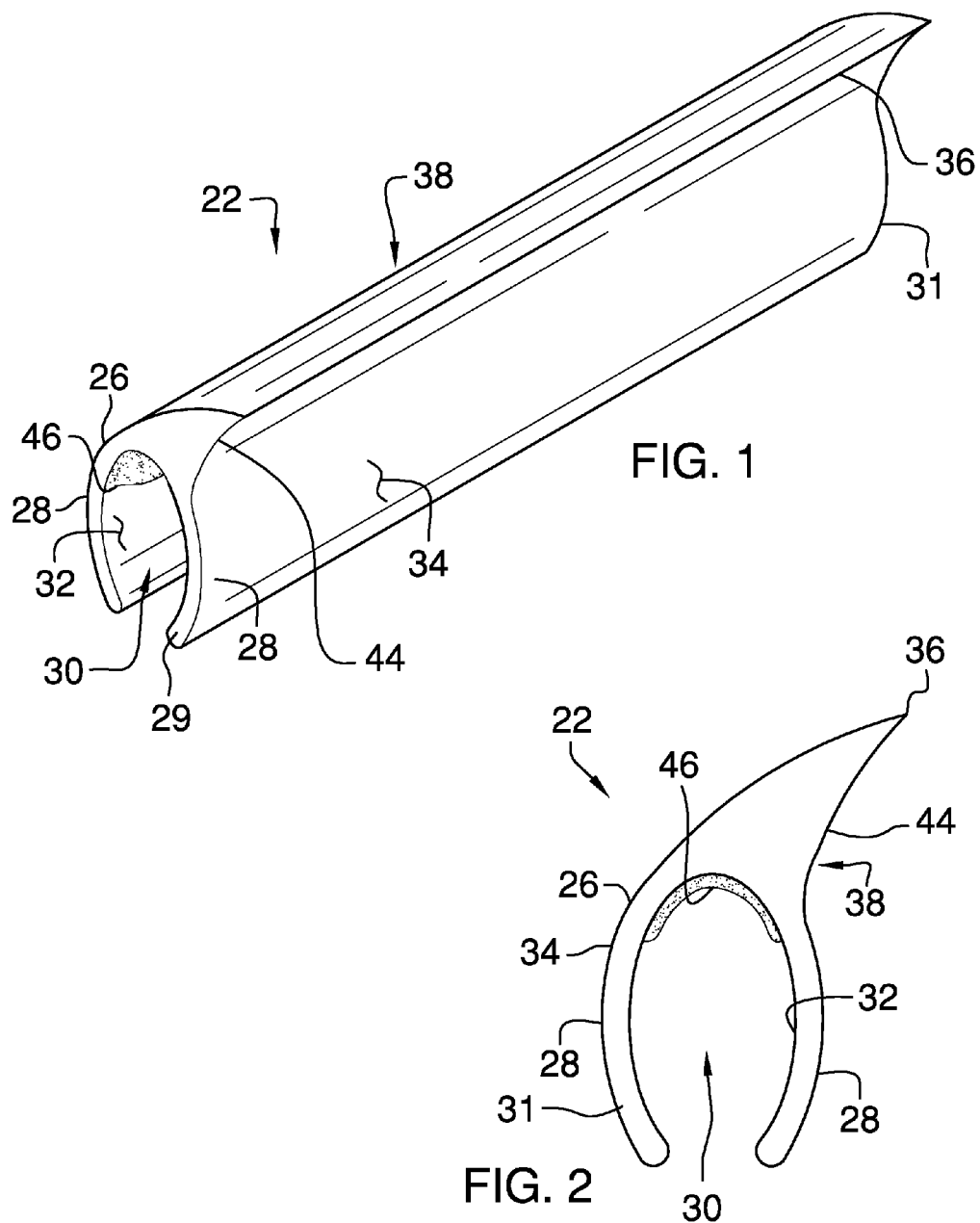

WIND DEFLECTION SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to deflection units and more particularly pertains to a new deflection unit for deflecting wind on a vehicle.

BRIEF SUMMARY OF THE INVENTION

An embodiment of the disclosure meets the needs presented above by generally comprising a vehicle that has a windshield to redirect wind with respect to a rider of the vehicle. A deflecting unit is coupled to the windshield to deflect wind upwardly with respect to the rider. In this way the deflecting unit inhibits the wind from striking the rider's head.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 1 is a front perspective view of a wind deflection system according to an embodiment of the disclosure.

FIG. 2 is a right side view of deflection unit of an embodiment of the disclosure.

DETAILED DESCRIPTION OF THE INVENTION

Figure 3:
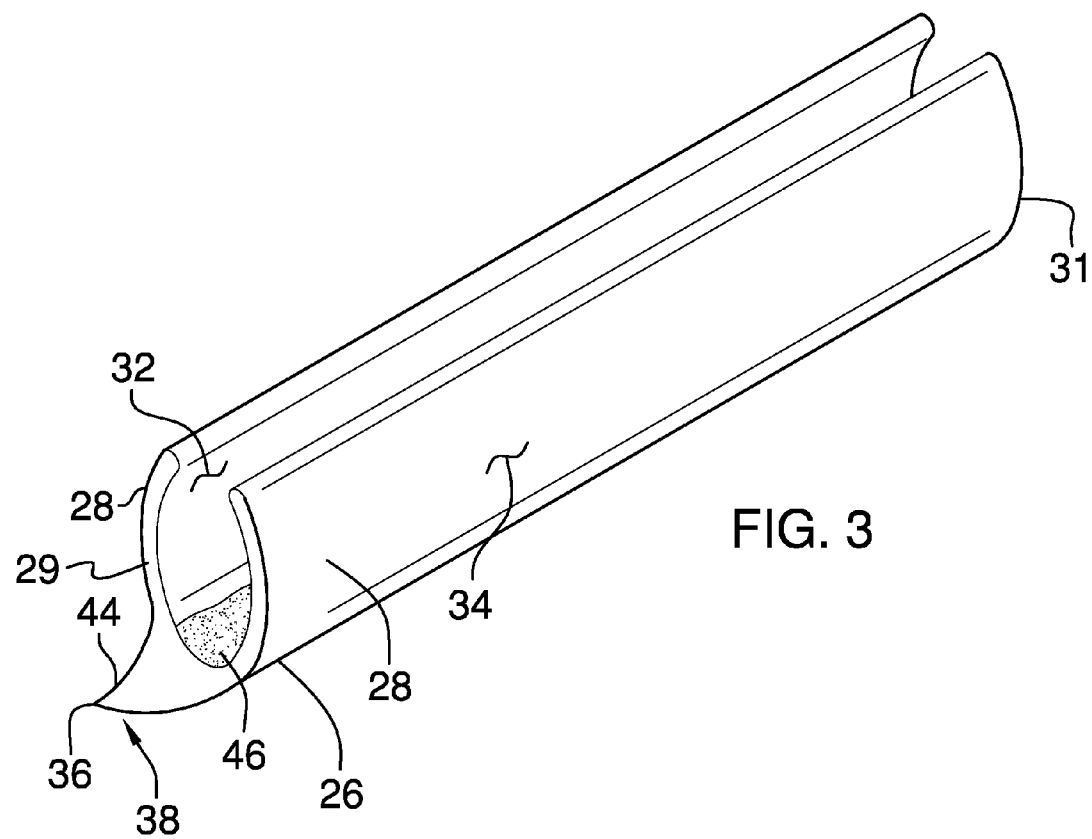
FIG. 3 is a bottom perspective view of deflection unit of an embodiment of the disclosure.
Figure 4:
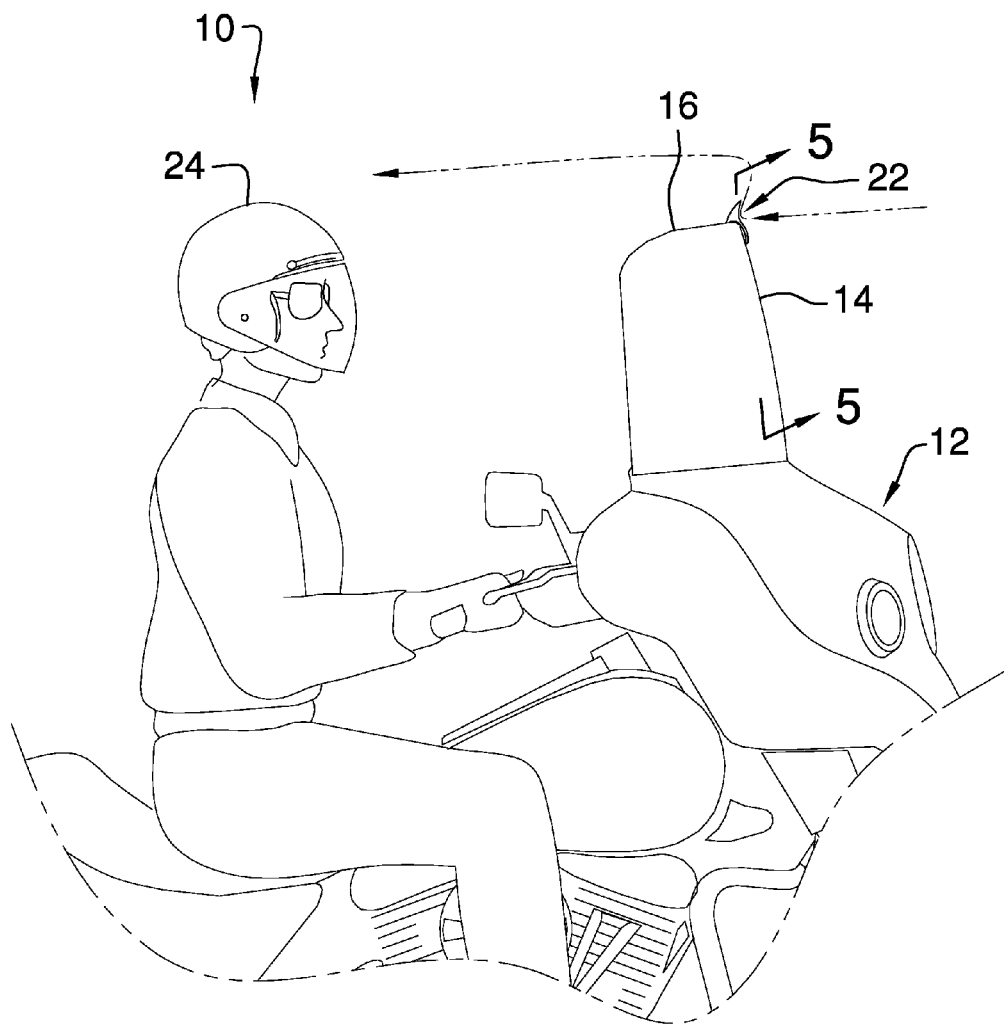
FIG. 4 is a perspective in-use view of an embodiment of the disclosure.
Figure 5:
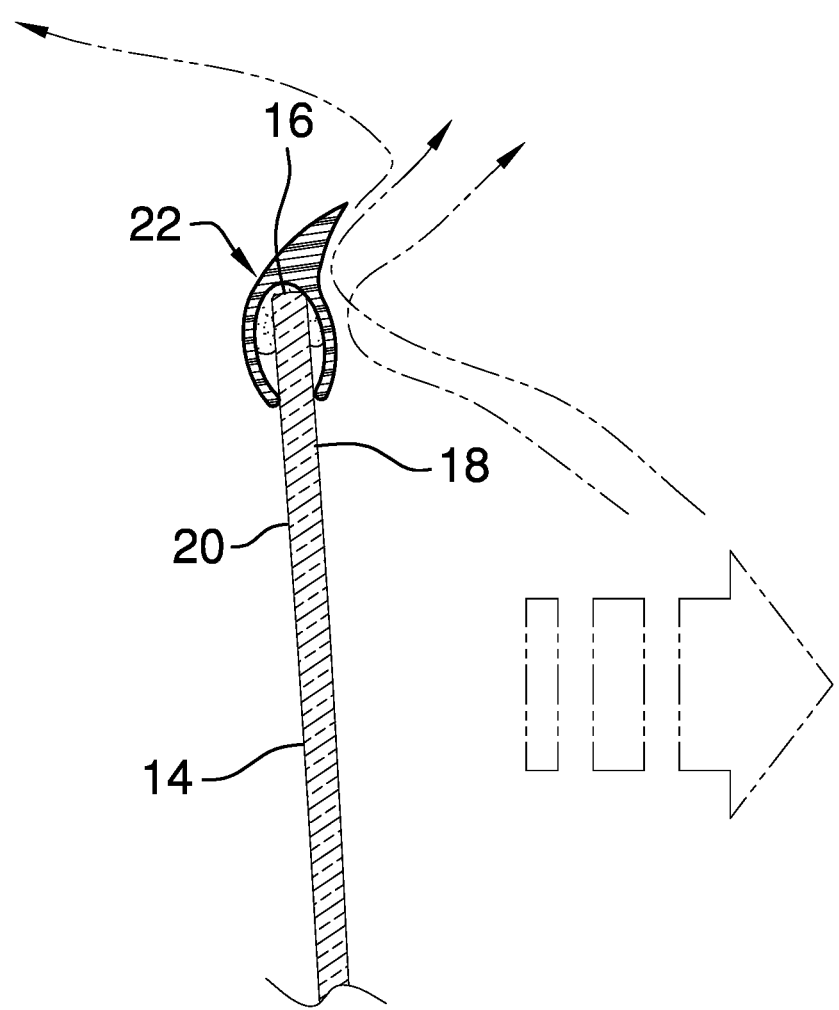
FIG. 5 is a cross sectional view taken along line 5-5 of FIG. 4 of an embodiment of the disclosure.

With reference now to the drawings, and in particular to FIGS. 1 through 5 thereof, a new deflection unit embodying the principles and concepts of an embodiment of the disclosure and generally designated by the reference numeral 10 will be described.

As best illustrated in FIGS. 1 through 5, the wind deflection system 10 generally comprises a vehicle 12 that has a windshield 14 to redirect wind with respect to a rider 15 of the vehicle 12. The windshield 14 has a top edge 16, a front surface 18 and a rear surface 20. The vehicle 12 may be a may be a motorized vehicle including, but not being limited to, a quad, a three wheeled tricycle, a motorcycle, a personal watercraft, a snowmobile or any other vehicle that has a rider 15.

A deflecting unit 22 is provided and the deflecting unit 22 is coupled to the windshield 14 to deflect wind upwardly with respect to the rider 15. In this way the deflecting unit 22 inhibits the wind from striking the rider's head 24. The deflecting unit 22 comprises a saddle 26 that has a pair of spaced members 28. Each of the spaced members 28 is elongated between a first end 29 and a second end 31 of the saddle 26 and the spaced members 28 are spaced apart from each other to define a windshield space 30 in the saddle 26. The top edge 16 of the windshield 14 is positioned in the windshield space 30 having the saddle 26 being coextensive with the top edge 16.

The saddle 26 has an inwardly facing surface 32 and an outwardly facing surface 34. The outwardly facing surface 34 tapers to a distal edge 36 with respect to the spaced members 28 to define a wing 38 on the saddle 26. The wing 38 extends between the first end 29 and the second end 31 of the saddle 26. The wing 38 has a front side 44 and the front side 44 is concavely arcuate between the spaced members 28 and the distal edge 36. The saddle 26 is positioned on the top edge 16 having the wing 38 being directed forwardly with respect to the windshield 14. In this way the wing 38 deflects the wind upwardly with respect to the rider's head 24 thereby reducing fatigue. The wing 38 may form an angle of approximately 45.0 degrees with respect to a vertical axis that bisects the saddle 26. Additionally, the saddle 26 is comprised of a resiliently bendable material such as rubber or the like and the saddle 26 extends along an entire width of with windshield 14.

An adhesive layer 46 is provided and the adhesive layer 46 is positioned on the inwardly facing surface 32 of the saddle 26. The adhesive layer 46 extends between the first end 29 and the second end 31 and the adhesive layer 46 is centrally positioned between the spaced members 28. The adhesive layer 46 adhesively engages the top edge 16 of the windshield 14 such that the saddle 26 is retained on the windshield 14.

In use, the saddle 26 is positioned on the top edge 16 of the windshield 14. The adhesive layer 46 engages the windshield 14 to retain the saddle 26 on the windshield 14. The saddle 26 is oriented to direct with wing 38 upwardly and forwardly with respect to the windshield 14. The wing 38 directs air in an upward direction when the vehicle 12 is ridden. In this way, the deflecting unit 22 inhibits the wind from hitting the rider's head 24 when the vehicle 12 is ridden.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A wind deflection system comprising:
   a vehicle having a windshield wherein said windshield is configured to redirect wind with respect to a rider of said vehicle, said windshield having a top edge, a front surface and a rear surface; and
   a deflecting unit being coupled to and extending outwardly away from a top edge from said windshield wherein said deflecting unit is configured to deflect wind upwardly with respect to the rider thereby inhibiting the wind from striking the rider's head, said deflecting unit comprising:
      a saddle having a pair of spaced members, each of said spaced members being elongated between a first end and a second end of said saddle, said spaced members being spaced apart from each other to define a windshield space in said saddle, said top edge of said windshield being positioned in said windshield space having said saddle being coextensive with said top edge, said saddle having an inwardly facing surface and an outwardly facing surface, said outwardly facing surface extending upwardly and tapering to a distal edge with respect to said spaced members to define a wing on said saddle, said outwardly facing surface being concavely arcuate at an obtuse angle to the front surface at the distal edge, said saddle being positioned on said top edge having said wing being directed forwardly with respect to said windshield wherein said wing is configured to deflect the wind upwardly with respect to the rider's head.

2. A wind deflection system comprising:
   a vehicle having a windshield wherein said windshield is configured to redirect wind with respect to a rider of said vehicle, said windshield having a top edge, a front surface and a rear surface;
   a deflecting unit being coupled to and extending outwardly away from a top edge of said windshield wherein said deflecting unit is configured to deflect wind upwardly with respect to the rider thereby inhibiting the wind from striking the rider's head, said deflecting unit comprising:
      a saddle having a pair of spaced members, each of said spaced members being elongated between a first end and a second end of said saddle, said spaced members being spaced apart from each other to define a windshield space in said saddle, said top edge of said windshield being positioned in said windshield space having said saddle being coextensive with said top edge, said saddle having an inwardly facing surface and an outwardly facing surface, said outwardly facing surface extending outwardly away from a top edge of said windshield and tapering to a distal edge with respect to said spaced members to define a wing on said saddle, said outwardly facing surface being concavely arcuate at an obtuse angle to the front surface at the distal edge, said saddle being positioned on said top edge having said wing being directed forwardly with respect to said windshield wherein said wing is configured to deflect the wind upwardly with respect to the rider's head; and
      an adhesive layer being positioned on said inwardly facing surface of said saddle, said adhesive layer extending between said first end and said second end, said adhesive layer being centrally positioned between said spaced members, said adhesive layer adhesively engaging said top edge of said windshield such that said saddle is retained on said windshield.

* * * * *